United States Patent
Pruthi

(10) Patent No.: US 8,359,524 B2
(45) Date of Patent: Jan. 22, 2013

(54) PARALLEL REED-SOLOMON RAID (RS-RAID) ARCHITECTURE, DEVICE, AND METHOD

(75) Inventor: Arvind Pruthi, Los Gatos, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/537,828

(22) Filed: Jun. 29, 2012

(65) Prior Publication Data
US 2012/0266049 A1  Oct. 18, 2012

Related U.S. Application Data

(63) Continuation of application No. 12/274,874, filed on Nov. 20, 2008, now Pat. No. 8,219,887.

(60) Provisional application No. 60/989,670, filed on Nov. 21, 2007.

(51) Int. Cl.
*G11C 29/00* (2006.01)
(52) U.S. Cl. ............................ 714/769; 714/52; 714/767
(58) Field of Classification Search .................... 714/52, 714/767, 769
See application file for complete search history.

(56) References Cited

U.S. PATENT DOCUMENTS

| 5,889,934 | A | 3/1999 | Peterson |
| 6,952,797 | B1* | 10/2005 | Kahn et al. .................... 714/770 |
| 2002/0161972 | A1* | 10/2002 | Talagala et al. ............... 711/114 |
| 2006/0218470 | A1 | 9/2006 | Dickson |
| 2007/0245173 | A1 | 10/2007 | Elliott et al. |

OTHER PUBLICATIONS

Plank, James S., "A Tutorial on Reed-Solomon Coding for Fault-Tolerance in RAID-like Systems," *Software Practice and Experience*, vol. 27, No. 9, pp. 995-1012, Sep. 1997; John Wiley & Sons, Ltd.

International Searching Authority, International Search Report for PCT/US2008/012944, dated Feb. 4, 2010.

* cited by examiner

*Primary Examiner* — Sam Rizk

(57) ABSTRACT

The parallel RS-RAID data storage architecture can aggregate that data and checksums within each cluster into intermediate or partial sums that are transferred or distributed to other clusters. The use of intermediate data symbols, intermediate checksum symbols, cluster configuration information on the assignment of data storage devices to clusters and the operational status of data storage devices, and the like, can reduce the computational burden and latency for the error correction calculations while increasing the scalability and throughput of the parallel RS-RAID distributed data storage architecture.

20 Claims, 6 Drawing Sheets

PARALLEL REED-SOLOMON RAID (RS-RAID) ARCHITECTURE, DEVICE, AND METHOD

INCORPORATION BY REFERENCE

This is a continuation of U.S. application Ser. No. 12/274,874, filed on Nov. 20, 2008, which claims the benefit of U.S. Provisional Application No. 60/989,670, "Parallel RAID Implementation for RAID6 and Reed-Solomon Code," filed on Nov. 21, 2007, including all cited references which are incorporated herein by reference in their entirety.

BACKGROUND

A redundant array of inexpensive disks (RAID) architecture uses a group of data storage units, such as hard disks, to provide fault-tolerant data storage. The RAID architecture uses a forward error correction (FEC) code and extra data storage units to protect information from errors and disk failures. The information symbols may be bits, bytes or words. The information symbols can be encoded to form code symbols that include data and checksum or parity symbols. For systematic forward error correcting codes, the information symbols can be represented explicitly in the data symbol portion of a code symbol.

Reed-Solomon codes can be used in RAID architectures (RS-RAID) to tolerate a number of failures of storage units equal to the number of checksum symbols. For example, a quadruple-error correcting RS-RAID architecture that allocates 20 storage units for data and 4 storage units for checksums can tolerate failures in up to four storage devices, inclusive.

An RS-RAID architecture normally uses a single RAID controller to protect the data symbols that are written to the data storage units. When a single RAID controller is used to perform the checksum, encoding, and decoding calculations, the throughput or data storage and retrieval rate of the RAID architecture may be reduced relative to a non-RAID and fault-intolerant data storage architecture. Accordingly, a high throughput, fault-tolerant distributed data storage architecture may be desirable.

SUMMARY

In high-performance storage architectures, multiple RAID controllers may communicate with each other over a common set of communication paths called a communication fabric. The communication fabric may have a high latency compared to communication path between a RAID controller and the storage devices assigned to the given RAID controller. The high latency communication fabric may reduce the throughput of RAID data storage architecture unless the traffic for data, messages, configuration, and the like between RAID controllers is matched to the tasks of fault-tolerant, distributed data storage. Each RAID controller, which may be interposed between the communication fabric and an assigned set of data storage devices, may be called a node of the data storage architecture. The RAID controller and the assigned data storage devices may be called a data storage cluster.

The Reed-Solomon RAID (RS-RAID) architecture can protect information symbols that are written to and read from storage devices, such as hard disks, by including redundant data storage devices. An RS-RAID architecture that uses m checksum devices can tolerate as many as m simultaneous failures of the data storage devices. The m checksum symbols may be denoted $c_1, c_2, \ldots, c_m$. The RS-RAID architecture can also include a number, n, of data storage devices for information-bearing or data symbols denoted $d_1, d_2, \ldots, d_n$.

The checksum and data storage devices may store data and checksum symbols as bits, bytes, words, and the like. It may be noted that certain types forward error correction codes (FEC), such as Reed-Solomon codes (RS), normally use bytes. For example, an RS code can operate on blocks of bytes, such as a block that encodes 233 information bytes into 233 data bytes and 32 checksum bytes in a 255 byte block.

The RS-RAID architecture can use the data symbols $d_1, d_2, \ldots, d_n$ held by the corresponding data storage devices $D_1, D_2, \ldots, D_n$, to calculate the checksum symbol, $c_i$, to be stored in the $i^{th}$ checksum device, $C_i$. The RS-RAID architecture can determine each $c_i$ ($1 \leq i \leq m$), such that if any m or fewer of the $D_1, D_2, \ldots, D_n, C_1, C_2, \ldots, C_m$ storage devices fail, then the contents of any of the failed devices can be reconstructed from the intact or non-failed devices. The RS-RAID architecture can provide fault-tolerant operation due to the properties of a Vandermonde matrix that is used to calculate and maintain checksum symbols and recover information from data and checksum symbols read from the storage devices. A RS-RAID controller can recover the data and/or checksum symbols despite failures in the storage devices by computing a matrix inverse of an (n×n) portion of an adjoined or augmented Vandermonde and identity matrix.

In order to generate the checksum symbols, the RS-RAID architecture can weight the data symbols by elements of the Vandermonde matrix and sum the weighted data symbols using a linear function $F_i$ per EQ. 1. The function $F_i$ can be obtained from the $i^{th}$ row of elements of the Vandermonde matrix, so that $F_i = [f_{i,1}; f_{i,2}; \ldots; f_{i,n}]^T$.

$$c_i = \sum_{j=1}^{n} d_j f_{i,j} \qquad \text{EQ. 1}$$

In other words, if the data and checksum symbols are represented as (n×1) and (m×1) dimensional vectors $D=[d_1, d_2, \ldots, d_n]^T$ and $C=[c_1, c_2, \ldots, c_m]^T$, respectively, and the functions $F_i$ are represented as rows of a matrix F, then the RS-RAID architecture can encode the checksum symbols according to EQ. 2a.

$$C = FD \qquad \text{EQ. 2a}$$

which is equivalent to:

$$\begin{bmatrix} c_1 \\ c_2 \\ \vdots \\ c_m \end{bmatrix} = \begin{bmatrix} f_{1,1} & f_{1,2} & \cdots & f_{1,n} \\ f_{2,1} & f_{2,2} & \cdots & f_{2,n} \\ \vdots & \vdots & & \vdots \\ f_{m,1} & f_{m,2} & \cdots & f_{m,n} \end{bmatrix} \begin{bmatrix} d_1 \\ d_2 \\ \vdots \\ d_n \end{bmatrix}. \qquad \text{EQ. 2b}$$

For advantageously-designed RS-RAID FEC codes, the F matrix can be an (m×n) Vandermonde matrix with elements: $f_{i,j} = j^{i-1}$ where the indices $i=1,2,\ldots,m$ and $j=1,2,\ldots,n$ correspond to the rows and columns of the Vandermonde matrix, respectively, and the algebraic operations are performed using the properties of a Galois field. For example, a (3×4) Vandermonde matrix can be written as:

$$F = \begin{bmatrix} 1 & 1 & 1 & 1 \\ 1 & 2 & 3 & 4 \\ 1 & 4 & 9 & 16 \end{bmatrix}. \quad \text{EQ. 3}$$

To recover an (n×1) information vector $\tilde{D}=[\tilde{d}_1,\tilde{d}_2,\ldots,\tilde{d}_n]^T$ from codewords or code symbols that may include error, the parallel RS-RAID architecture can invert an augmented or partitioned matrix A which includes the Vandermonde matrix and an adjoined ((n−m)×(n−m)) identity matrix, denoted I, and post-multiply an inverse of A by a set of data and checksum symbols, D and C, respectively, that are read from operational storage units. Symbolically, the recovered information vector, $\tilde{D}$, can be obtained from $\tilde{D}=\mathrm{Inv}(A)\cdot\lfloor E\rfloor$ where the augmented matrix is $$A \triangleq \begin{bmatrix} I \\ F \end{bmatrix}$$

and $$E \triangleq \begin{bmatrix} D \\ C \end{bmatrix}$$

is an augmented data and checksum symbol vector. The notation Inv(A) may be understood to be a function that yields a matrix inverse based on A, such as a matrix inverse of a subset of rows of A that form a nonsingular (n×n) square matrix and is conformal with a corresponding selected or winnowed set of n rows of the column matrix E, denoted $\lfloor E\rfloor$, as described below. The process of inverting the A matrix may be regarded as inverted a selected set of rows of A in which the selection is determined by a list of operational data storage devices and the requirement for conformality in a matrix times vector calculation. It may be noted that every subset of n rows of the ((n+m)×n) augmented matrix A is invertible because F is a Vandermonde matrix.

In expanded form, the equation $\tilde{D}=\mathrm{Inv}(A)\cdot\lfloor E\rfloor$ can be represented as:

$$\begin{bmatrix} \tilde{d}_1 \\ \tilde{d}_2 \\ \vdots \\ \tilde{d}_n \end{bmatrix} = \mathrm{Inv}\left( \begin{bmatrix} 1 & 0 & 0 & \cdots & 0 \\ 0 & 1 & 0 & \cdots & 0 \\ \vdots & \vdots & \vdots & & \vdots \\ 0 & 0 & 0 & \cdots & 1 \\ \hline 1 & 1 & 1 & \cdots & 1 \\ 1 & 2 & 3 & \cdots & n \\ \vdots & \vdots & \vdots & & \vdots \\ 1 & 2^{m-1} & 3^{m-1} & \cdots & n^{m-1} \end{bmatrix} \right) \cdot \begin{bmatrix} d_1 \\ d_2 \\ \vdots \\ d_n \\ \hline c_1 \\ c_2 \\ \vdots \\ c_m \end{bmatrix} \quad \text{EQ. 4}$$

where conformality is enforced by selecting corresponding rows of E and A before inverting the selected portion of matrix A.

In other words, each storage device in the RS-RAID architecture can be represented by a row of the augmented matrix A and a corresponding element of the column vector $E=[d_1, d_2, \ldots, d_n, c_1, c_2, \ldots, c_m]^T$. If none out of m redundant storage devices fail, then the recovered information symbols can be determined by selecting any subset of n rows of A and n corresponding elements E to form a square matrix A' that may be described as a data recovery matrix and a vector of the data read from the corresponding data storage units $E'=\lfloor E\rfloor$. In other words, $\mathrm{Inv}(A)=(A')^{-1}$ and $\tilde{D}=(A')^{-1}\cdot E'$. For example, for a 4+2 RS-RAID architecture, the recovered or decoded data $\tilde{D}$ can be a vector of recovered data symbols extracted from the first 4 rows of the augmented Vandermonde matrix and the first four entries of the data and checksums read from the storage device array, per:

$$\begin{bmatrix} \tilde{d}_1 \\ \tilde{d}_2 \\ \tilde{d}_3 \\ \tilde{d}_4 \end{bmatrix} = \mathrm{Inv}\left( \begin{bmatrix} 1 & 0 & 0 & 0 \\ 0 & 1 & 0 & 0 \\ 0 & 0 & 1 & 0 \\ 0 & 0 & 0 & 1 \\ \hline \cancel{1\ 1\ 1\ 1} \\ \cancel{1\ 2\ 3\ 4} \end{bmatrix} \right) \cdot \begin{bmatrix} d_1 \\ d_2 \\ d_3 \\ d_4 \\ \cancel{c_1} \\ \cancel{c_2} \end{bmatrix} = \begin{bmatrix} d_1 \\ d_2 \\ d_3 \\ d_4 \end{bmatrix} \quad \text{EQ. 5}$$

If, for example, the third, the fifth, or both the third and the fifth data storage devices fail, then $\tilde{D}$ can be recovered from E' by selecting 4 rows that correspond to operational devices, as follows:

$$\begin{bmatrix} \tilde{d}_1 \\ \tilde{d}_2 \\ \tilde{d}_3 \\ \tilde{d}_4 \end{bmatrix} = \mathrm{Inv}\left( \begin{bmatrix} 1 & 0 & 0 & 0 \\ 0 & 1 & 0 & 0 \\ \cancel{0\ 0\ 1\ 0} \\ 0 & 0 & 0 & 1 \\ 1 & 1 & 1 & 1 \\ \cancel{1\ 2\ 3\ 4} \end{bmatrix} \right) \cdot \begin{bmatrix} d_1 \\ d_2 \\ \cancel{d_3} \\ d_4 \\ c_1 \\ \cancel{c_2} \end{bmatrix} = \begin{bmatrix} 1 & 0 & 0 & 0 \\ 0 & 1 & 0 & 0 \\ 0 & 0 & 0 & 1 \\ 1 & 1 & 1 & 1 \end{bmatrix}^{-1} \begin{bmatrix} d_1 \\ d_2 \\ d_4 \\ c_1 \end{bmatrix} \quad \text{EQ. 6a}$$

$$\begin{bmatrix} \tilde{d}_1 \\ \tilde{d}_2 \\ \tilde{d}_3 \\ \tilde{d}_4 \end{bmatrix} = \mathrm{Inv}\left( \begin{bmatrix} 1 & 0 & 0 & 0 \\ 0 & 1 & 0 & 0 \\ 0 & 0 & 1 & 0 \\ 0 & 0 & 0 & 1 \\ \cancel{1\ 1\ 1\ 1} \\ \cancel{1\ 2\ 3\ 4} \end{bmatrix} \right) \cdot \begin{bmatrix} d_1 \\ d_2 \\ d_3 \\ d_4 \\ \cancel{c_1} \\ \cancel{c_2} \end{bmatrix} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}^{-1} \begin{bmatrix} d_1 \\ d_2 \\ d_3 \\ d_4 \end{bmatrix} \quad \text{EQ. 6b}$$

$$\begin{bmatrix} \tilde{d}_1 \\ \tilde{d}_2 \\ \tilde{d}_3 \\ \tilde{d}_4 \end{bmatrix} = \mathrm{Inv}\left( \begin{bmatrix} 1 & 0 & 0 & 0 \\ 0 & 1 & 0 & 0 \\ \cancel{0\ 0\ 1\ 0} \\ 0 & 0 & 0 & 1 \\ \cancel{1\ 1\ 1\ 1} \\ 1 & 2 & 3 & 4 \end{bmatrix} \right) \cdot \begin{bmatrix} d_1 \\ d_2 \\ \cancel{d_3} \\ d_4 \\ \cancel{c_1} \\ c_2 \end{bmatrix} = \begin{bmatrix} 1 & 0 & 0 & 0 \\ 0 & 1 & 0 & 0 \\ 0 & 0 & 0 & 1 \\ 1 & 2 & 3 & 4 \end{bmatrix}^{-1} \begin{bmatrix} d_1 \\ d_2 \\ d_4 \\ c_2 \end{bmatrix} \quad \text{EQ. 6c}$$

where a double strike through can indicate a failure of a storage device and a single strike through can indicate a de-selection of a storage device for purpose of forming the matrix inverse and performing subsequent calculations. The matrix inverse may be calculated by Gaussian elimination or another method. Once the values of $\tilde{D}$ are obtained, then the values of any recovered or estimated checksum vector $\tilde{C}$ may be computed based on a data vector $\tilde{D}$ using $\tilde{C}=F\tilde{D}$.

The parallel RS-RAID data storage architecture can aggregate that data and checksums within each cluster into intermediate or partial sums that are transferred or distributed to all clusters. The use of intermediate data symbols, intermediate checksum symbols, cluster configuration information on the assignment of data storage devices to clusters and the operational status of data storage devices, and the like, can reduce the computational burden and latency for the error correction calculations while increasing the scalability and throughput of the parallel RS-RAID distributed data storage architecture.

BRIEF DESCRIPTION OF THE DRAWINGS

This disclosure will refer to the accompanying figures, wherein like numerals represent like elements, and wherein.

DETAILED DESCRIPTION OF EMBODIMENTS

Figure 1:
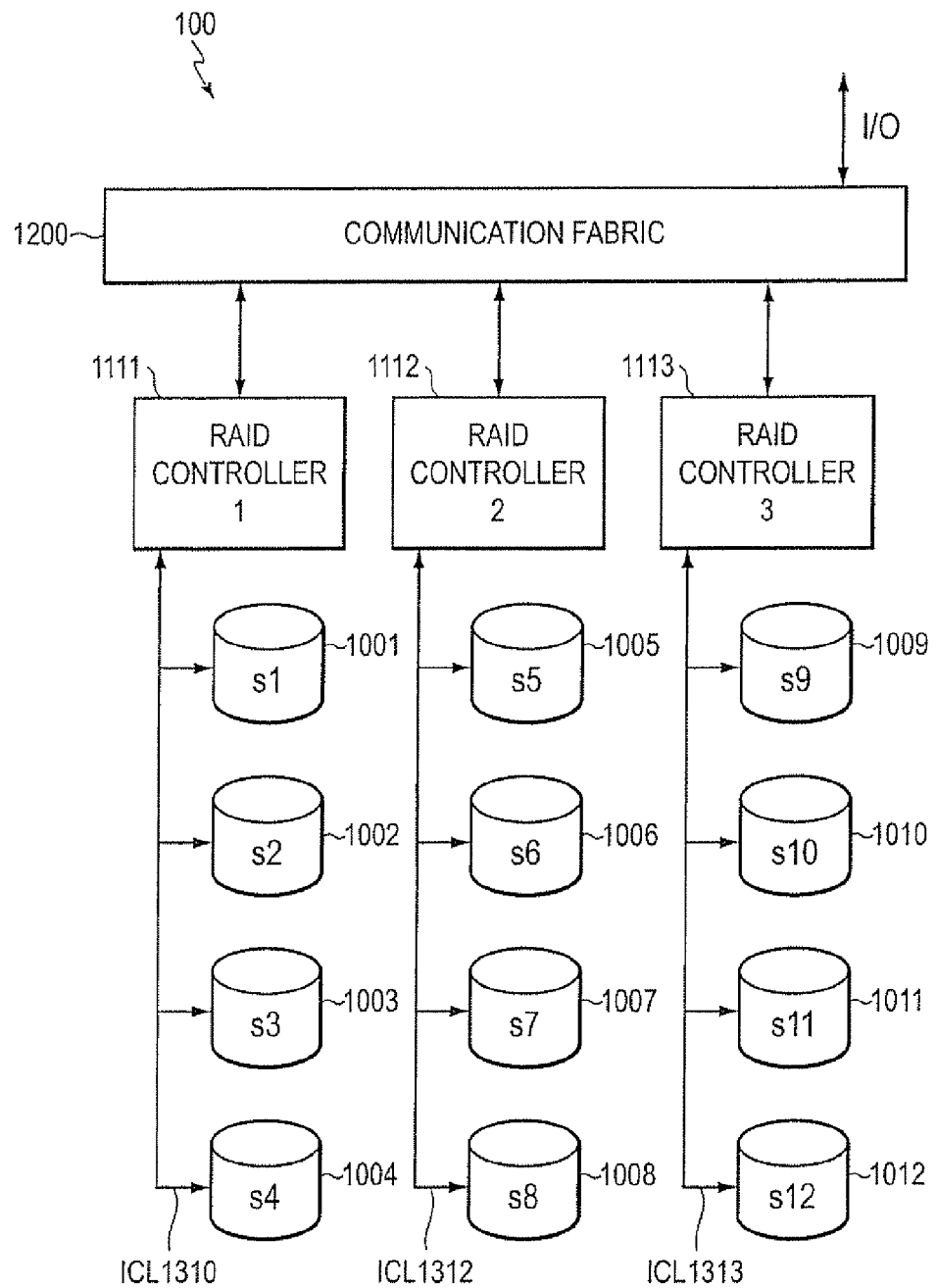
FIG. 1 is an example of a parallel Reed-Solomon redundant array of inexpensive disk (RS-RAID) architecture.

FIG. 1 is an example of a parallel RS-RAID architecture 100 for data storage. The parallel RS-RAID architecture 100 can include a communication fabric 1200, RAID controllers 1111-1113, and storage devices 1001-1012. The storage devices 1001-1004, 1005-1008, and 1009-1012 can couple to the RAID controllers 1111-113, respectively. In other words, a subset or cluster of the storage devices 1001-1012 can couple to each corresponding RAID controller 1111-1113. The number of storage devices that can couple to each RAID controller 1111-1113 may or may not be equal and the configuration or mapping of storage devices to RAID controllers may change dynamically to improve fault-tolerance, improve throughput, and the like. For example, the assignment of storage devices 1001-1012 to the RAID controllers 1111-1113 may be determined by a configuration matrix or a similar data structure.

Figure 2:
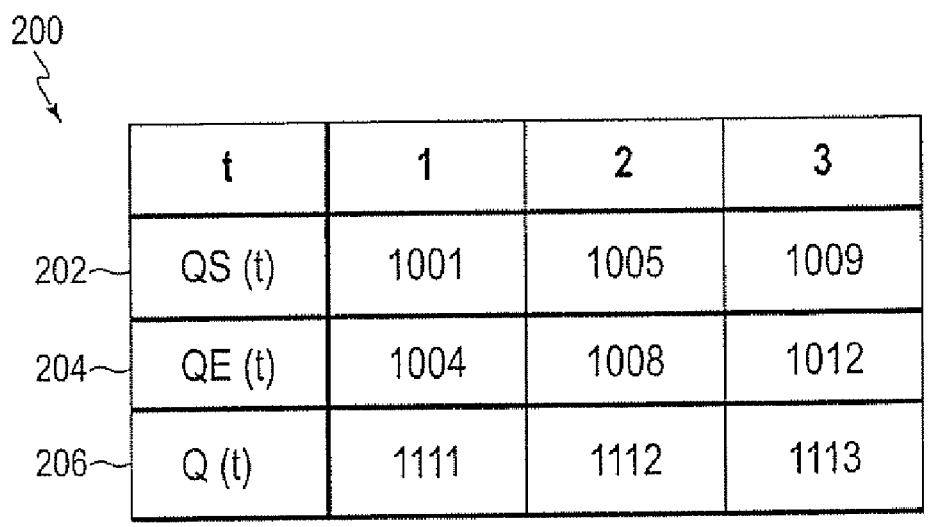
FIG. 2 is an example of a configuration matrix.

FIG. 2 shows an example of a configuration matrix 200 that can include a variable "t" which is an index or counter of the number of RAID controllers. For example, row 206 of the configuration matrix 200 shows a mapping function, Q(t), between the RAID controller index number "t" and a respective RAID controller, such as RAID controller 1111-1113. Row 202 shows a RAID storage device starting index QS(t), and row 204 shows a storage device ending index, QE(t). For example, QS(2)=1005 and QE(2)=1008. It may be noted that offsets in device numbers may be supplied via a function J( )such that, for example, J(QS(2))=5, which can indicate, for example, that the fifth storage device starts the second storage device cluster. The configuration matrix 200 can map storage devices to corresponding RAID controllers. In other words, the configuration matrix 200 can determine or control which subset or cluster of storage devices is assigned to a given RAID controller. For purposes of computation, the configuration matrix 200 can determine a start and an end of weighted partial sums that can encode or decode code words, update or maintain checksums and data, and the like, as described below.

The communication fabric 1200 can couple input and output (I/O) digital signals between the RAID controllers 1111-1113 and between the parallel RS-RAID architecture 100 and external devices. For example, the communication fabric 1200 can couple digital signals, such as data symbols, checksum symbols, intermediate data and checksum symbols, and the like, between the RAID controllers 1111-1113. The communication fabric 1200 may use a parallel bus structure, a serial data link, an optical backplane, and the like. The communication fabric 1200 may use one type of bus, link, or backplane structure for external communication and another type for communication between the RAID controllers 1111-1113.

The RAID controllers 1111-1113 can compute data checksum symbols, for each storage device in a subset or cluster of assigned storage devices as given by a configuration matrix, such as the configuration matrix 200, or other data structure. The RAID controllers 1111-1113 can aggregate or accumulate partial sums of error-correcting code calculations and can report the aggregated data and parity calculation results over the communication fabric 1200 to other RAID controllers in the parallel RS-RAID architecture 100. While the details of the partial sum calculations for data and checksum symbols may be described with reference to a specific RAID controller, a corresponding calculation may be performed by any RAID controller in the parallel RS-RAID architecture 100, such as the RAID controller 1111.

Figure 3:
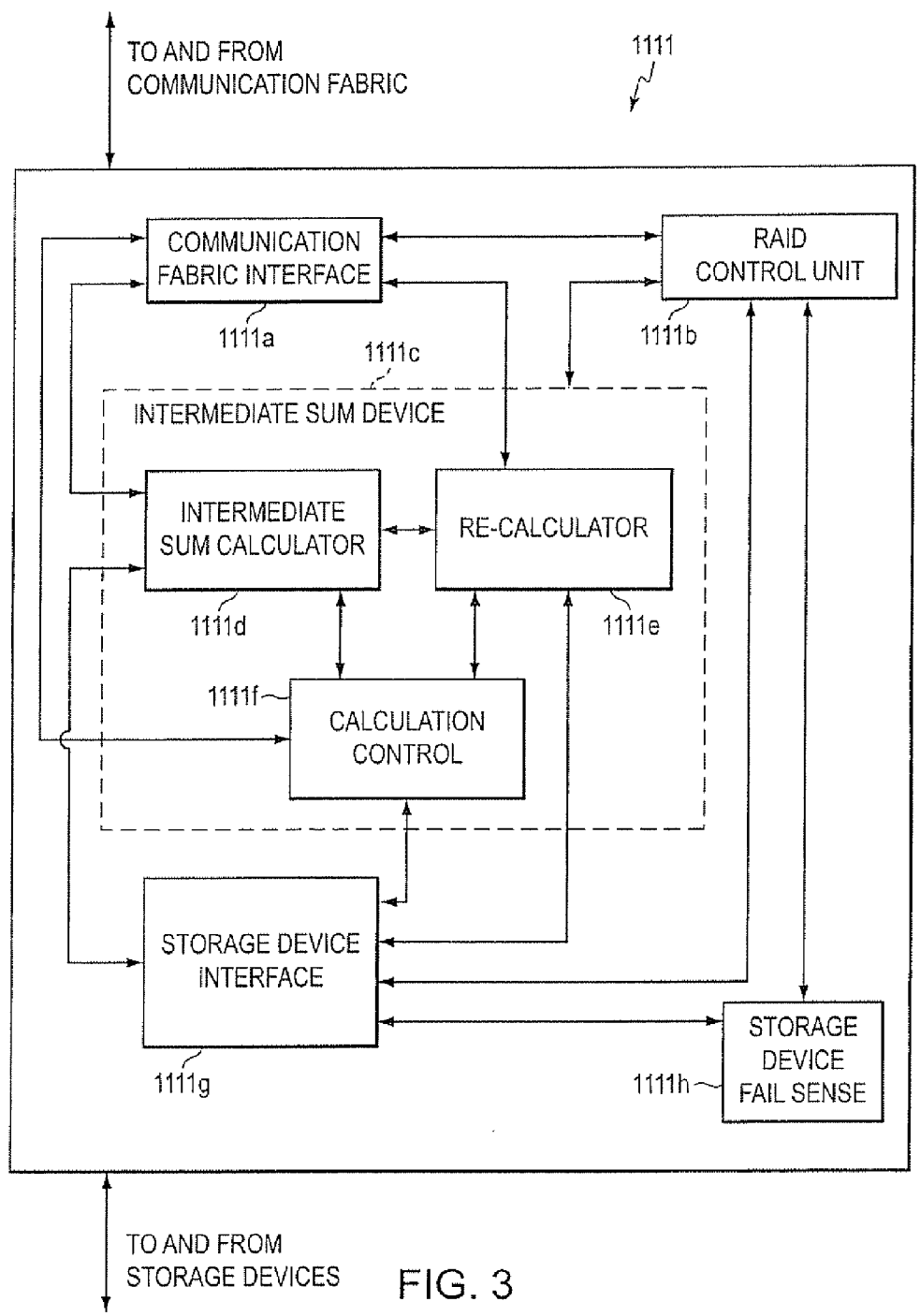
FIG. 3 is an example of a RAID controller.

FIG. 3 shows an example of a RAID controller 1111 that can include a communication fabric interface 1111a, a RAID control unit 1111b, an intermediate sum device 1111c, a storage device interface 1111g, and a storage device fail sense unit 1111h. The communication fabric interface 1111a can couple signals to and from a communication fabric, such as the communication fabric 1200, to the intermediate sum device 1111c and the RAID control unit 1111b, The RAID control unit 1111b can couple to the intermediate sum device 1111c, the storage device interface 1111g, and the storage device fail sense unit 1111h. The storage device interface 1111g can couple to the RAID control unit 1111b, the intermediate sum device 1111c, and the storage device fail sense unit 1111h. The RAID controller 1111 can couple to and from the communication fabric 1200 as previously described and to and from the storage devices, such as the storage devices 1001-1004, via the storage device interface 1111g.

The intermediate sum device 1111c can include an intermediate sum calculator 1111d, a re-calculator 1111e, and a calculation control 1111f. The intermediate sum calculator 1111d can couple to the communication fabric interface 1111a, the storage device interface 1111g, the re-calculator 1111e, and the calculation control 1111f. The re-calculator 1111e can couple to the communication fabric interface 1111a, the intermediate sum calculator 1111d, the calculation control 1111f, and the storage device interface 1111g. The calculation control 1111f can couple to the intermediate sum calculator 1111d, the re-calculator 1111e, and the storage device interface 1111g.

The communication fabric interface 1111a can transfer information symbols between the parallel RS-RAID architecture 100 and an external device and couple information symbols, portions of information symbols, data symbols, checksum symbols, such as intermediate checksum symbols, control signals, clock signals, and the like between the communication fabric 1200 and elements of the RAID controller 1111. The communication fabric interface 1111a can reformat information symbols from bits to bytes, words or other symbols, multiplex and de-multiplex signals, synchronize data transfers, buffer signals with line drivers and receivers, and the like. In other words, the communication fabric interface 1111a can condition digital signals for transmission over a communication fabric, such as a digital bus, buffer data transfers, and the like.

The RAID control unit 1111b can receive signals from the communication fabric interface 1111a and the storage devices, select data symbols from a subset of information symbols, stripe data and checksum symbols across storage devices control the operation of the intermediate sum device 1111c according to a forward-error correction code (FEC code), and the like. For example, the subset of information symbols can be those information symbols to be represented by data symbols and stored in the operational data storage devices that are controlled by the RAID controller 1111. The intermediate sum device 1111c may receive status information regarding the number of operational storage devices from the RAID control unit 1111b, which can obtain the status information from the storage device fail sense unit 1111h.

The storage device fail sense unit 1111h can determine the operational status of any storage device coupled to the RAID controller 1111 and can determine a list of operational storage devices. In other words, the storage device fail sense unit 1111h can determine if a given storage device becomes unsuitable for reliable storage of data and checksums. The storage device fail sense unit 1111h can test storage devices for reliable operation, determine if given storage devices are online, declare a unit offline if a response from a given storage unit is not received within a predetermined time-out interval, determine if a signal quality metric is below a threshold quality for data read from a storage device, list the operational storage devices, and the like. The storage device fail sense unit 1111h can record the results of such tests and can distribute a list of the operational storage devices for elements of the RAID controller 1111, such as the RAID control unit 1111b.

The intermediate sum calculator 1111d can calculate intermediate, local, partial sums into which an error correction code calculations for checksums and data can be decomposed, as described with respect to EQ. 8 and EQ. 13, respectively. The intermediate or partial sums may be a weighted sum of symbols that are read from the operational storage devices in a cluster that report to the RAID controller 1111. For example, the cluster of storage devices and the corresponding limits of summation of such partial sums may be determined from a configuration matrix, such as the configuration matrix 200, or other data structure. The intermediate sum calculator 1111d can, after receiving corresponding partial sums from other RAID controllers, such as the RAID controller 1112 or the RAID controller 1113, calculate the data and checksum symbols.

The re-calculator 1111e can re-calculate an intermediate, local checksum based on data from the storage devices that are directly coupled to the RAID controller 1111 and non-local intermediate checksums from other RAID controllers that are transferred through the communication fabric interface 1111a. In other words, when a change in a data or checksum symbol occurs in either a local storage device that is directly coupled to the RAID controller 1111 or from an intermediate checksum that is transmitted to the RAID controller 1111 over the communication fabric 1200, then the re-calculator 1111e can modify the results from intermediate sum calculator 1111d accordingly.

The calculation control 1111f can control both the intermediate sum calculator 1111d and the re-calculator 1111e to determine when an intermediate checksum calculation result or a re-calculated checksum should be used for FEC. The RAID control 1111b can signal the calculation control 1111f directly or through the communication fabric interface 1111a to determine which of the intermediate sum calculator 1111d or re-calculator 1111e results are to be calculated. The RAID control 1111b can obtain status information, such as operational status, on the data storage devices from the storage device fail sense unit 1111h.

The parallel RAID controllers 1111-1113 can compute and store checksums according to:

$$c_i = \sum_{t=1}^{r} \sum_{j=J(QS(t))}^{J(QE(t))} d_j f_{i,j} = \sum_{t=1}^{r} c_{i,t} \qquad \text{EQ. 7}$$

where an index, t, can range from one up to the number of RAID controllers, r, and $c_{i,t}$ is an $i^{th}$ intermediate checksum for the $t^{th}$ index. For example, r can equal three for the parallel RS-RAID architecture 100. As noted with respect to the configuration matrix 200, QS(t) and QE(t) can map the starting and ending storage devices to RAID controllers and can determine the limits of summation for the partial sum that generates each intermediate checksum $c_{i,j}$. The function $J(\cdot)$ can subtract an offset such that, for example, J(1002)=2.

The $t^{th}$ RS-RAID controller, such as the RAID controller 1111, can compute an intermediate checksum, $c_{i,t}$, according to:

$$c_{i,t} = \sum_{j=J(QS(t))}^{J(QE(t))} d_j f_{i,j} \qquad \text{EQ. 8}$$

The use of intermediate checksums, $c_{i,t}$, can reduce data traffic on the communication fabric 1200, which can increase the throughput of the parallel RS-RAID architecture 100. For example, in an 8+4 RS-RAID architecture, if a single master RAID controller were to control all of the storage devices and compute the checksums then eight data symbols could be transferred over the communication fabric. In contrast, using the intermediate checksum calculator results from an 8+4 parallel RS-RAID architecture, only two intermediate checksum symbols may need to be transferred over the communication fabric.

In addition to computing intermediate and full checksums, the parallel RS-RAID architecture 100 can modify or maintain checksum symbols when a data symbol changes. For example, when a data symbol changes from $d_j$ to $d'_j$, then the checksums can be re-calculated per:

$$c'_i = c_i + f_{i,j}(d'_j - d_j) \qquad \text{EQ. 9}$$

In implementing the calculation of EQ. 9, the RAID controller 1111 can compute a data difference, $(d'_j - d_j)$, and can weight the data difference by a Vandermonde element, $f_{i,j}$, viz:

$$c'_{i,t} = \sum_{j=J(QS(t))}^{J(QE(t))} f_{i,j}(d'_j - d_j). \qquad \text{EQ. 10}$$

An individual parallel RAID controller 1111-1113 can send the temporary component, $c'_{i,t}$, to the other of the RAID controllers 1111-1113. The RS-RAID controllers 1111-1113 can update the respective assigned storage devices according to:

$$c'_i = c_i + \sum_{t=1}^{r} c^r_{i,t}. \qquad \text{EQ. 11}$$

When a storage device fails, for example, when the storage device fail sense unit 1111h detects a hard disk crash, then the inverse of the augmented matrix, Inv(A) may be modified by parallel RAID controller 1111-1113 to form an inverse, Inv (A'), that corresponds to the remaining or operational data storage devices. The matrix Inv(A') may be a static data structure as long as no additional storage device failures occur. Once another storage device fails, Inv(A') can be calculated once then broadcast to all operational RAID controllers, such as the RAID controllers 1111-1113. If more storage devices fail later, a new inverse (Inv(A")) may be re-calculated and broadcast to all RAID controllers.

The parallel RS-RAID architecture 100 can recover data symbols, despite a storage device failure, as using intermediate or partial sums that are computed locally at each RAID controller. The recovered data $\tilde{D} = [\epsilon \tilde{d}_1 \tilde{d}_2, \ldots, \tilde{d}_n]^T$ may be recovered from:

$$\begin{bmatrix} \tilde{d}_1 \\ \tilde{d}_2 \\ \vdots \\ \tilde{d}_n \end{bmatrix} = \begin{bmatrix} a_{1,1} & a_{1,2} & \ldots & a_{1,n} \\ a_{2,1} & a_{2,2} & \ldots & a_{2,n} \\ \vdots & \vdots & & \vdots \\ a_{n,1} & a_{n,2} & \ldots & a_{n,n} \end{bmatrix} \begin{bmatrix} e_1 \\ e_2 \\ \vdots \\ e_n \end{bmatrix}. \quad \text{EQ. 12}$$

where the elements of Inv(A') may be denoted $a_{i,j}$, where $1 \leq i \leq n$ and $1 \leq j \leq n$. The elements of the corresponding data and checksum symbols, $E' = [e_1, e_2, \ldots, e_n]^T$, can be read from the operational and selected data storage devices. The parallel RS-RAID architecture 100 can select or winnow the rows of E and a corresponding subset of the adjoined identity and Vandermonde matrix to form E' and Inv(A'), respectively. In other words, the parallel RS-RAID architecture 100 can decompose the data recovery calculation into a set of partial sums or intermediate data symbols per:

$$\tilde{d}_{i,t} = \sum_{j=J(QS(t))}^{J(QE(t))} a_{i,j} \cdot e_j \quad \text{EQ. 13}$$

where the $e_j$ is understood to be the set of all data or checksum symbols that are within the control of the $t^{th}$ RS-RAID controller.

Upon receiving a message, such as an intermediate data symbol, from other parallel RS-RAID controllers, an individual RAID controller can first calculate the intermediate data symbols $\tilde{d}_{i,t}$ then compute the recovered data $\tilde{d}_i$ per:

$$\tilde{d}_i = \sum_{t=1}^{r} \tilde{d}_{i,t}. \quad \text{EQ. 14}$$

Figure 4A:
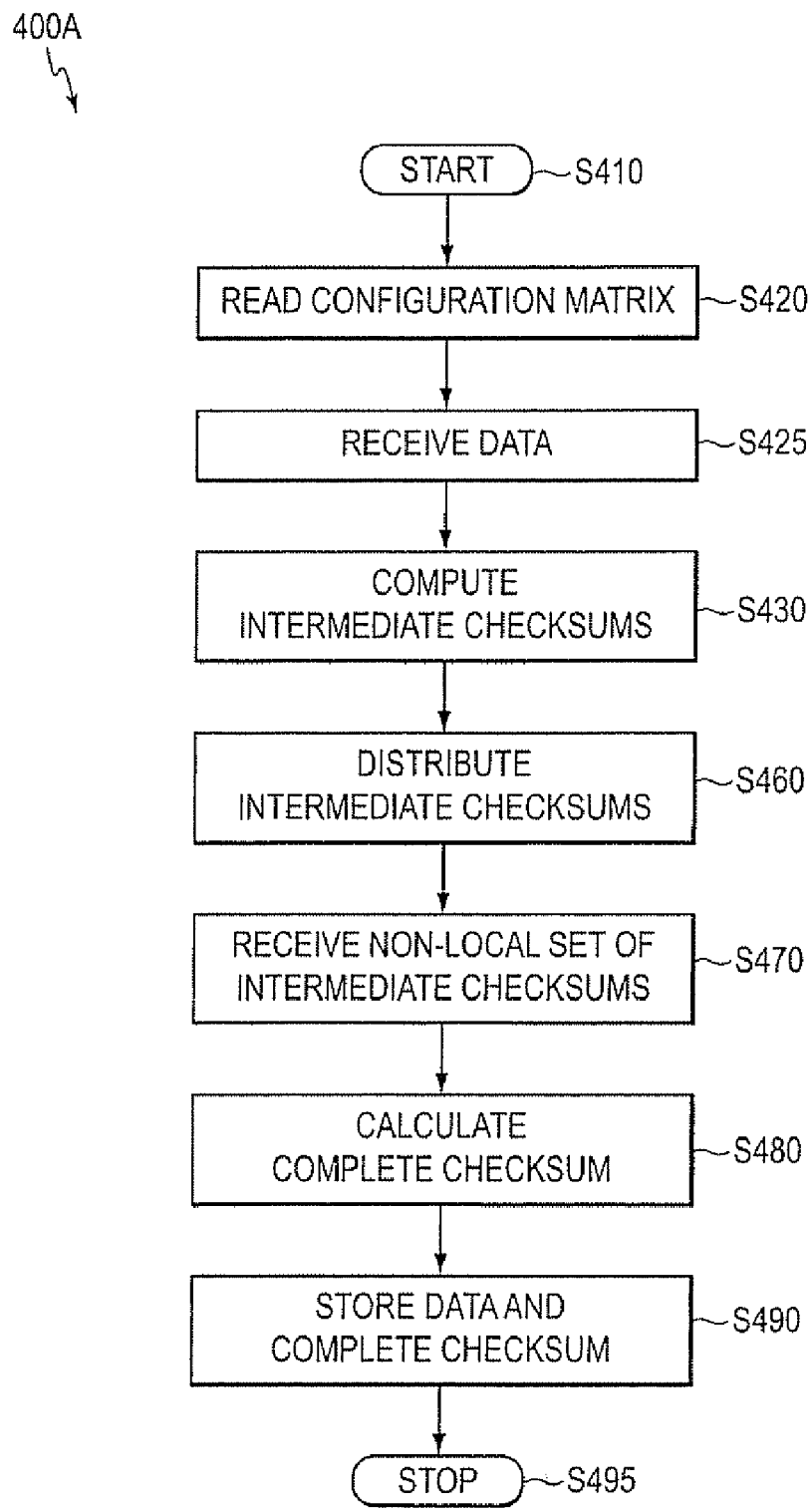
FIG. 4A-B are examples of a checksum program flow chart and a checksum update program flow chart.

FIG. 4A shows an example of a checksum program flow chart 400A for a parallel RS-RAID architecture for data storage. The program flow chart 400A can start at program step S410 and can proceed to program step S420 in which a configuration matrix of the parallel RS-RAID architecture can be read. For example, the configuration matrix can specify the start and end device numbers for storage devices associated with a given RAID controller such as the configuration matrix described with respect to FIG. 2. It may be understood that each RAID controller can store a local copy of the configuration matrix, harmonize the configuration matrix with other RAID controllers, receive the configuration matrix from a higher level RAID device or network controller, and the like.

From program step S420, the program can flow to program step S425 in which the program can read information-bearing data symbols to be stored from an external device. For example, the program can receive a set of 2 Kb data blocks from a flash drive that are received over a communication fabric.

From program step S425, the program flow can proceed to program step S430 in which the intermediate checksums can be calculated. For example, the intermediate checksums or data and parity calculations can be computed from a linear combination of data words using EQ. 8 and the properties of a Galois field. Program step S430 can compute the intermediate checksums and updated or maintained intermediate checksums using stored codeword symbols from 1) individual operational storage units that supply portions of codeword symbols to a given RAID controller and 2) aggregated or intermediate checksum from other RAID controllers that communicate with the given RAID controller over a communication fabric. In other words, low-latency data and parity bits, bytes or words from a local subset data storage units can be combined with high-latency, accumulated or partially summed data and parity in the form of $c_{i,t}$ from other data storage units. Then, the program flow proceeds to program step S460.

In step S460, the program can distribute the intermediate checksums to different RS-RAID controllers. For example, if $Q(t)=t$, the program step S460 can distribute the first intermediate checksum from the first RAID controller $c_{1,1}$ to the second and third RS-RAID controllers.

From program step S460, the program flow can proceed to program step S470 in which the program can receive intermediate checksums from other RAID controllers. From program step S470, the program can proceed to program step S480. The set of intermediate checksums can enable each RAID controller to compute a complete checksum $c_i$ per EQ. 8 and store the $c_i$ for subsequent error correction and detection calculations. For example, the program can receive a second and a third intermediate checksum $c_{i,2}$ and $c_{i,3}$ that, along with a locally computed first checksum $c_{i,1}$, can form a sufficient set of checksums to compute $C_1$.

From program step S480, the program flow can proceed to program step S490 in which the program can store the data and complete checksum symbols that are assigned to a RAID controller that executes the program. For example, the program can stripe the data and checksum symbols across an array of disks. From program step S490, the program flow can proceed to program S495 in which program execution can stop.

Figure 4B:
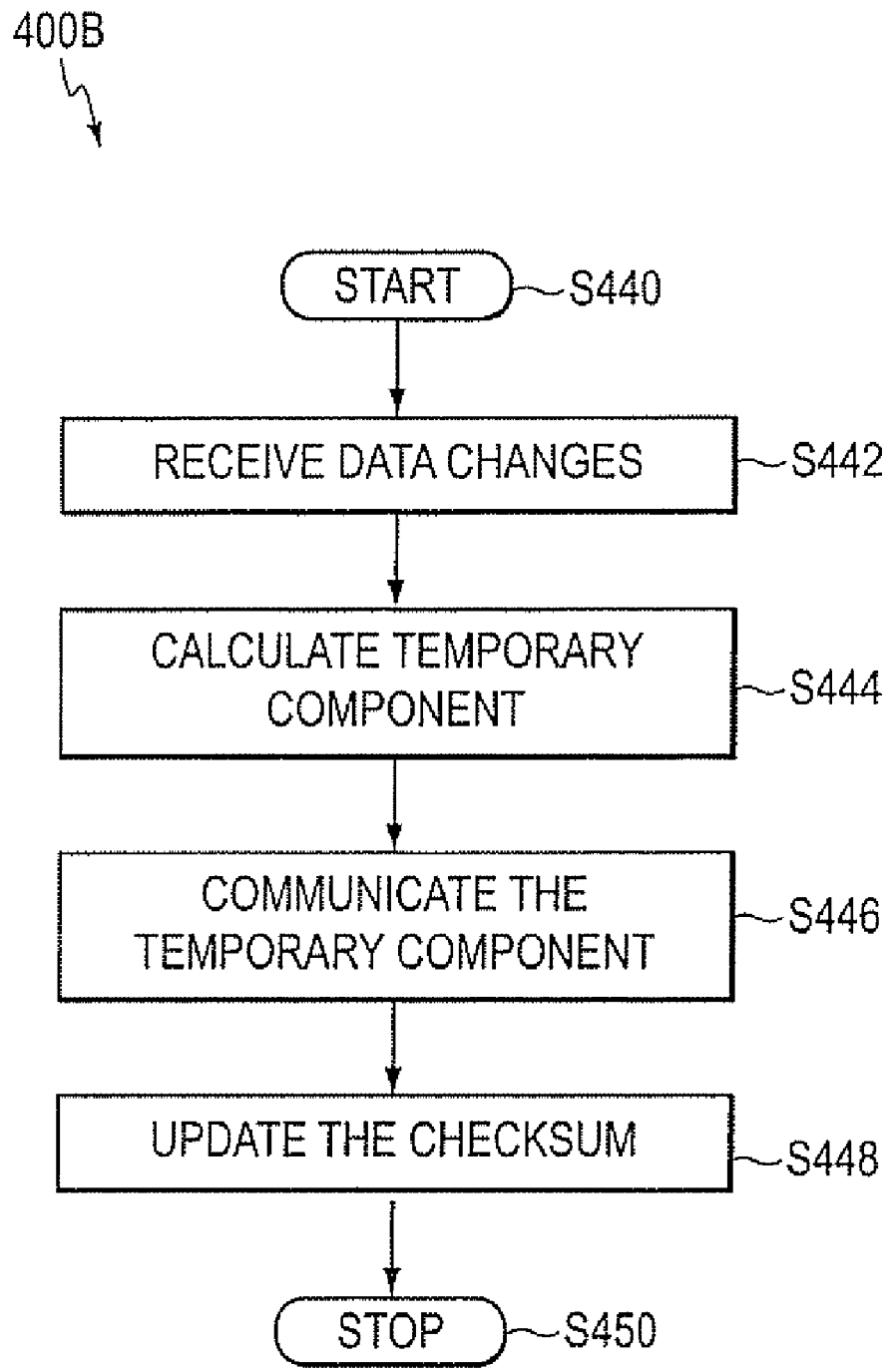

FIG. 4B shows an example of a checksum update program flow chart 400B for a parallel RS-RAID architecture for data storage. The program flow chart 400B starts at step S440, and proceeds to step S442.

In step S442, the parallel RS-RAID architecture may receive data changes. For example, a storage device may receive a new data symbol to replace an old data symbol. The program flow can then proceed to step S444.

In step S444, a RAID controller that couples to the storage device can calculate temporary component according to EQ. 10. The RAID controller may obtain a data difference between the new data symbol and the old data symbol, and may weight the data different by a Vandermonde matrix element. Then, the program flow can proceed to step S446.

In step S446, the temporary component can be communicated to the other RAID controllers. In an embodiment, a communication fabric may couple various RAID controllers. The communication fabric may communicate the temporary component corresponding to the data change to the RAID controllers that control the storage devices for storing checksums. Then, the program flow can proceed to step S448.

In step S448, the RAID controllers that control the storage devices for storing checksums may update the checksums based on the received temporary component, for example according to EQ. 11. Then, the program flow can proceed to step S450, and stop.

Figure 5:
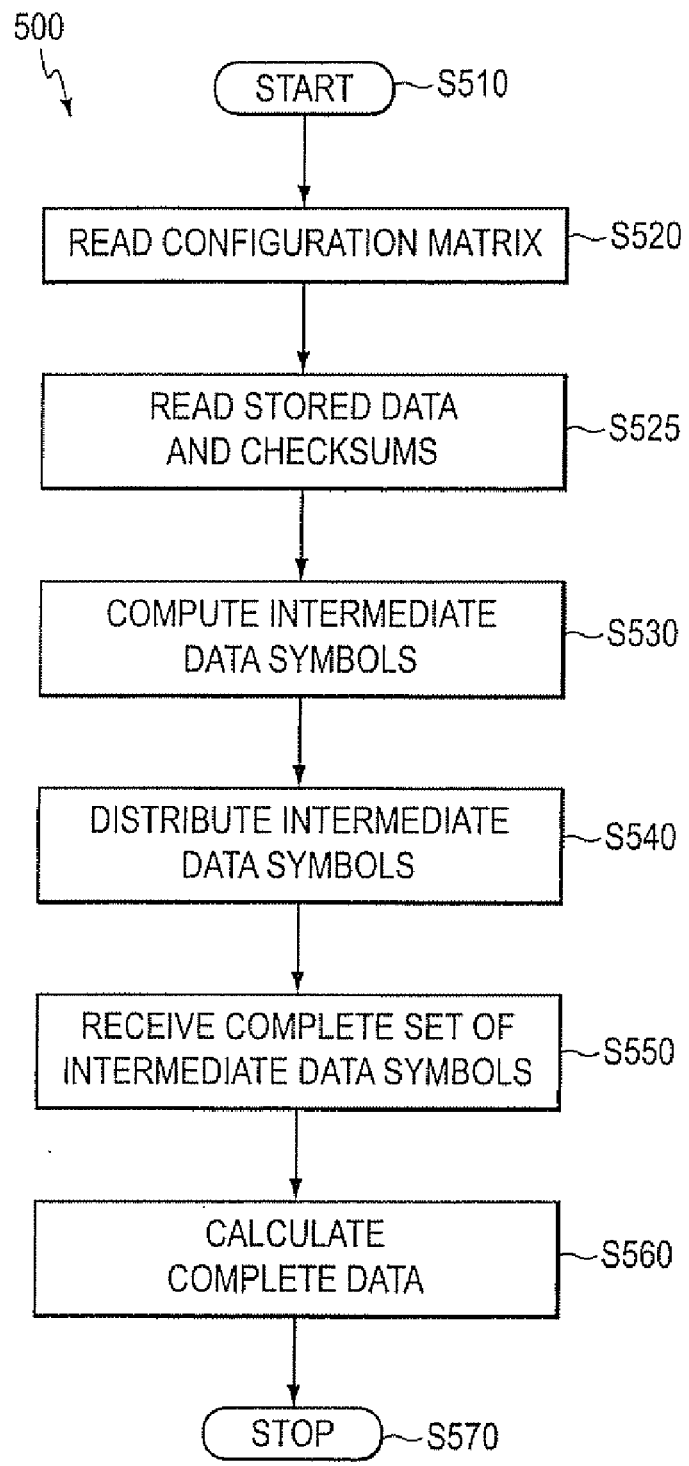
FIG. 5 is an example of a data program flowchart.

FIG. 5 shows an example of a data program flowchart 500 for a parallel RS-RAID architecture for data storage. The program flowchart 500 can start at program step S510 and can proceed to program step S520 in which a configuration matrix of the parallel RS-RAID architecture can be read as is discussed with respect to FIG. 4. From program step S520, the program flow can proceed to program step S525 in which data and checksum symbols can be read from storage devices. For example, 8 data and 4 checksum symbols can be read from 12 storage devices. In this example, at least 8 data or checksum symbols can be read from operational storage devices.

From program step S425, program flow can proceed to programs step S530 in which the program can compute intermediate data symbols. For example, the program can compute intermediate data symbols according to EQ. 13. It may be understood that the weight coefficients $a_{i,j}$ used in EQ. 13 may be pre-computed and distributed to RAID controllers or recomputed as needed, such as after reading the configuration matrix in program step S520. From program step S530, program flow can proceed to program step S540 in which the program can distribute intermediate data symbols to parallel RAID controllers.

From program step S540, the program flow can proceed to program step S550 in which the program can receive intermediate data symbols from parallel RAID controllers. From program step S550, program flow can proceed to program step S560 in which the program can calculate a recovered data symbol from the intermediate data symbols that are from both local and parallel RAID controllers. In other words, the program can sum the intermediate data symbols per EQ. 14. From program step S560, the program flow can proceed to program step S570 in which the program execution can stop.

While the invention has been described in conjunction with the specific exemplary embodiments thereof, it is evident that many alternatives, modifications, and variations will be apparent to those skilled in the art. Accordingly, embodiments of the invention as set forth herein are intended to be illustrative, and not limiting. There are changes that may be made without departing from the spirit and scope of the invention.

What is claimed is:

1. A distributed data storage device, comprising:
a controller unit configured to read a configuration matrix that assigns a plurality of data storage devices to a plurality of data storage clusters;
the plurality of data storage clusters configured to store a plurality of data symbols;
a calculator configured to compute a plurality of checksums of the data symbols stored in the data storage devices such that at least one checksum is computed for each of the data storage clusters; and
a communication fabric configured to distribute the checksums to each of the data storage clusters.

2. The distributed data storage device of claim 1, wherein the communication fabric is further configured to distribute a plurality of information symbols that include the data symbols to the data storage clusters.

3. The distributed data storage device of claim 2, wherein the control unit is further configured to select the data symbols from a subset of the information symbols.

4. The distributed data storage device of claim 1, further comprising:
a storage device fail sense unit configured to determine a list of operational data storage devices from the data storage devices.

5. The distributed data storage device of claim 4, wherein the control unit is further configured to compute a data recovery matrix based on the list of operational data storage devices.

6. The distributed data storage device of claim 5, further comprising:
an intermediate sum device configured to compute an intermediate data symbol based on the data recovery matrix and a vector of at least one of a read data symbol and a read checksum symbol that are read from the data storage devices.

7. The distributed data storage device of claim 5, wherein the communication fabric is further configured to distribute the data recovery matrix to the data storage clusters when the list of operational data storage devices changes.

8. The distributed data storage device of claim 1, further comprising:
an intermediate sum device configured to sum the checksums at each of the data storage clusters to form a checksum.

9. The distributed data storage device of claim 8, further comprising:
at least one data storage device configured to store the formed checksum.

10. The distributed data storage device of claim 8, wherein the intermediate sum device further comprises:
a re-calculator configured to update the checksum when a data symbol changes.

11. A method for error correction in a distributed data architecture, the method comprising:
computing a first checksum from a plurality of data symbols stored in a plurality of data storage clusters;
computing a second checksum of the data symbols based on a plurality of intermediate checksums that include the first checksum; and
distributing the intermediate checksums to the data storage clusters over a communication fabric.

12. The method of claim 11, wherein the computing is performed by a controller configured to store the computed second checksum of the data symbols in a data storage device.

13. The method of claim 11, wherein the communication fabric is coupled to each of the data storage clusters.

14. The method of claim 11, wherein the communication fabric is further configured to distribute a plurality of information symbols that include the data symbols to the data storage clusters.

15. The method of claim 14, further comprising:
selecting the data symbols from a subset of the information symbols.

16. The method of claim 11, further comprising:
determining a list of operational data storage devices from a plurality of data storage devices included in the data storage clusters.

17. The method of claim 16, further comprising:
computing a data recovery matrix based on the list of operational data storage devices.

18. The method of claim 17, further comprising:
distributing the data recovery matrix to the data storage clusters when the list of operational data storage devices changes.

19. The method of claim 16, further comprising:
calculating one of the intermediate checksums based on the list of operational data storage devices.

20. The method of claim 19, further comprising:
updating the first checksum when a data symbol changes.

* * * * *